US005339511A

United States Patent [19]

Bell

[11] Patent Number: 5,339,511

[45] Date of Patent: Aug. 23, 1994

[54] METHOD FOR SCREWING MEDICATION VIALS TO IV-BAGS

[76] Inventor: Margaret A. Bell, 1520 Mill Landing Rd., Virginia Beach, Va. 23462

[21] Appl. No.: 49,425

[22] Filed: Apr. 20, 1993

[51] Int. Cl.[5] .................... B23P 11/02

[52] U.S. Cl. .................... 29/451; 29/456; 29/777; 29/778

[58] Field of Search .................... 29/422, 450, 451, 456, 29/773, 777, 778, 809.09, 815, 240.5; 81/3.15, 3.44, 452, 454; 604/56, 82–88, 408–410

[56] References Cited

U.S. PATENT DOCUMENTS

| | | | |
|---|---|---|---|
| 1,924,579 | 8/1933 | Waterhouse | 81/3.1 |
| 2,760,391 | 8/1956 | Knutson | 81/52.4 |
| 2,985,045 | 5/1961 | Grasty et al. | 81/3.4 |
| 3,588,985 | 9/1969 | Shields | 29/777 X |
| 3,597,826 | 8/1971 | Shields | 29/777 |
| 3,795,158 | 3/1974 | Morita | 81/3.32 |
| 4,718,312 | 1/1988 | Jones | 81/3.2 |
| 4,726,264 | 2/1988 | Bost | 81/3.4 |
| 4,838,875 | 6/1989 | Somor | 604/408 X |
| 5,006,118 | 4/1991 | Yule | 604/408 |
| 5,084,040 | 1/1992 | Sutter | 604/403 |

*Primary Examiner*—Peter Dungba Vo
*Attorney, Agent, or Firm*—Wallace J. Nelson

[57] ABSTRACT

A method of screwing medication vials to IV-bags utilizing a power tool having a socket (58) with a bowl-shaped hard shell (60) defining a mouth (86) with a resilient material insert (62) lining an interior surface thereof and being held therein by a removable retainer at a lip of the mouth. The lining material defines a cylindrically-shaped vial-receiving cavity (88) of a size for receiving a bottom-end portion (96) of a medication vial, with lining material engaging radially the received bottom-end portion for imparting movement thereto. The socket has an attachment device (66) positioned at an end of the socket opposite the mouth for attaching the socket to a rotary motor (54, 102) of a rotating tool.

7 Claims, 2 Drawing Sheets

METHOD FOR SCREWING MEDICATION VIALS TO IV-BAGS

BACKGROUND OF THE INVENTION

This invention relates generally to the art of intravenous bags (IV-bags) and more specifically to devices for charging IV-bags with medications and the like.

IV-bags are used in large quantities in hospitals, clinics and other facilities where patients are being treated. In this regard, IV-bags are not only used for giving blood transfusions, but are also used extensively for providing nourishment and medications to patients. Regarding medications, they are often administered intravenously mixed in a saline or sugar carrier solution. It is important that many of these medications not be mixed with the carrier solutions in the IV-bags until immediately before the mixtures are to be "fed" into patients. Further, it is extremely important that IV-bags be charged with the correct medications for corresponding patients. That is, it would be extremely easy for nurses who would both prepare IV-bags and administer them to patients to become confused and administer the wrong medications to patients. Also, it is not a good idea to combine the medications with the IV-bags on hospital floors where conditions are less than sterile. Thus, most hospitals, especially larger hospitals, have found it to be beneficial for technicians to combine medications with IV-bags in sterile laboratories and then deliver these "combined bags", properly marked as to patients and medications, to the appropriate hospital rooms. A nurse then, upon administering an IV to a patient, checks the marked medication against the patient's chart and, if they correspond, she activates the medication so that it is only then mixed with the carrier solution, immediately before the IV is administered. Normally, medication vials are combined, or assembled, with IV-bags by screwing male-threaded necks of the medication vials into female-threaded mouths of the IV-bags, with sterile stoppers of the medication vials extending into the IV-bags. The medication vials are then left, thus attached, or screwed, to the IV-bags until they are to be used. In order to use an IV-bag with an attached medication vial, a nurse manipulates the flexible bag itself to cause a stopper remover in the bag to remove the stopper from the medication vial, with the stopper remover and stopper falling into the interior of the bag, thereby allowing the medication in the medication vial to enter into the IV-bag and mix with a carrier solution therein.

Although the above described system functions quite well, it has been found that it is extremely burdensome for and dangerous to technicians who must assemble the medication vials with the IV-bag. In this regard, often hundreds of medication vials are combined with IV-bags daily, thereby requiring many repetitions of screwing male threads on necks of medication vials into female threads on mouths of IV-bags. When these two members are being screwed together, the stopper remover is simultaneously screwed into an opening of the stopper. Thus, the screwing action involves overcoming much friction and, therefore, requires the expenditure of quite a bit of effort. Not only is this procedure unduly slow and burdensome for the technicians, it is also not accurate and increases the risk of getting a wrist abnormality known as "Carpal Tunnel Syndrome".

Therefore, it is an object of this invention to provide a tool and method for attaching medication vials to IV-bags which is fast, not unduly burdensome, and does not increase the risk of getting carpal tunnel syndrome. Similarly, it is an object of this invention to provide a tool and method for attaching medication vials to IV-bags which is not unduly expensive.

SUMMARY

According to principles of this invention, a tool and method for screwing medication vials onto IV-bags involves a socket having a resilient material lining for defining a vial-receiving cavity of a size and shape for receiving a bottom end portion of a vial with the lining material engaging the received bottom end for imparting movement from the socket to the vial for screwing the neck of the vial into an IV-bag. In one embodiment, the socket includes a removable retainer at a lip of a mouth of the socket for releasably holding an annularly-shaped resilient material insert in the socket. In one embodiment of the invention, the tool further comprises a rotating hand tool which is attached to the socket for rotating the socket. In a preferred embodiment, the socket is continuously rotated by a table mounted motor. Bottom ends of vials are inserted therein and IV-bags are manipulated to bring them into engagement with spinning threaded necks of the vials and for removing the vials from the socket.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
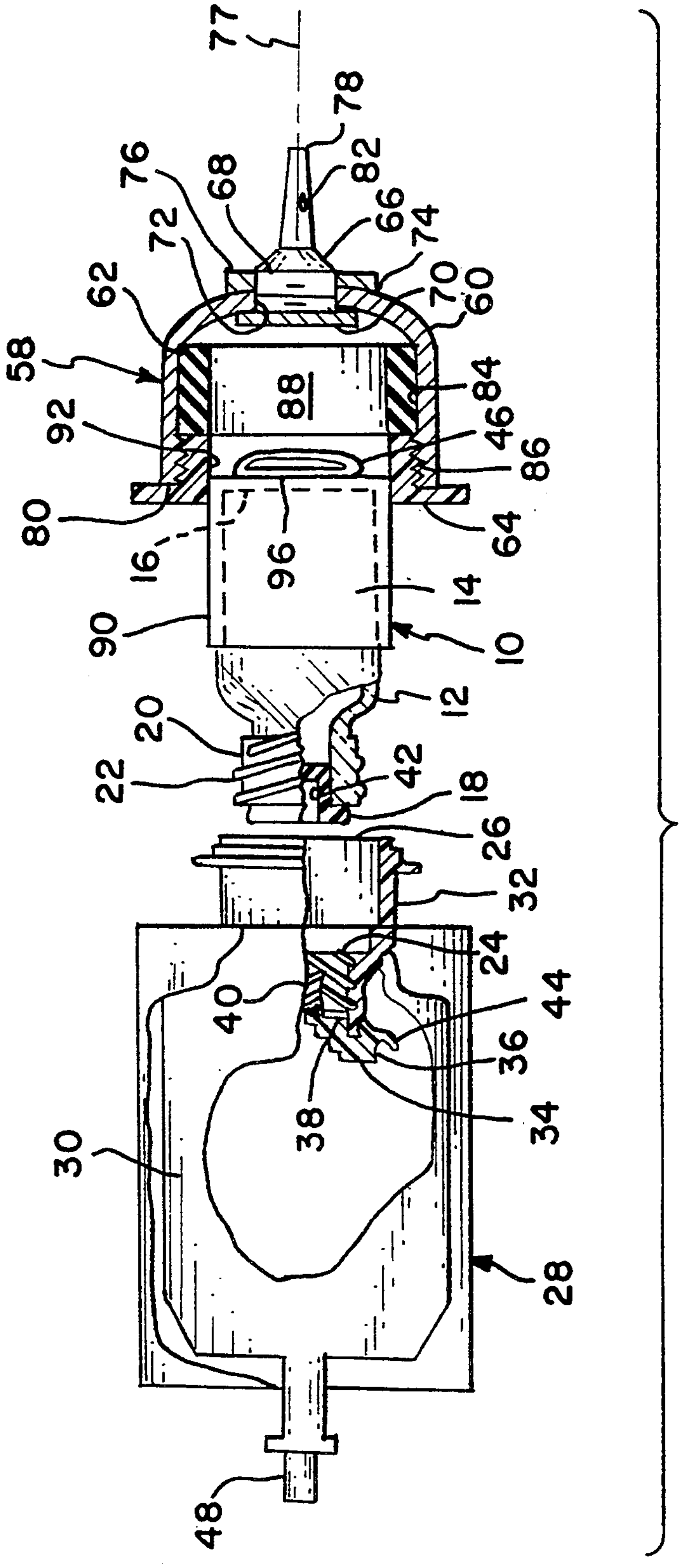
FIG. 1 is an exploded, partially cross-sectional and partially cut-away side view of a socket of the tool of this invention along with a medication vial and an IV-bag.

A medication vial 10 of a type with which this invention is normally used is generally constructed of a glass container 12 with a resinous plastic coaster 14 surrounding and attached to a closed bottom end portion 16 of the container 12 and a rubber stopper 18 which is inserted into a mouth of a male threaded neck 20 of the container 12. Male threads 22 of the threaded neck 20 are designed to screw into female threads 24 of a mouth 26 of an IV-bag 28.

The IV-bag 28 is comprised of a flexible, translucent, thin-plastic bag portion 30 for holding fluid therein, and a hard mouth portion 32 for defining the female threads 24 which mate with the male threads 22 of the glass container 12.

Another feature of this prior art IV-bag system is a stopper remover 34 which is snapped onto a lower end 36 of the hard mouth portion 32. This stopper remover 34 also serves as a cover for the IV-bag 28 in that it has an O-ring seal 38 which forms a seal between the hard mouth portion 32 and a hard portion of the stopper remover 34 so that a carrier fluid, solution, or liquid, which is in the bag portion 30 of the IV-bag 28 cannot prematurely escape through the mouth 26 of the IV-bag 28. But additionally, the stopper remover, has a male-threaded protrusion 40 thereon which, when the male threads 22 of the glass container 12 are screwed into the female threads 24 of the IV-bag 28, is screwed into a stopper cavity 42 of the stopper 18. Thus, it takes quite a bit of force to simultaneously screw the male threads 22 of the glass container 12 into the female threads 24 and the male-threaded protrusion 40 into the stopper 18 because of friction between these various parts.

Once the medication vial 10 has been assembled with the IV-bag 28 by mating the male threads 22 with the female threads 24, the medication in the glass container 12 remains in the glass container separated from the carrier fluid in the IV-bag 28. Such assemblies are marked for particular patients for which they have been prepared and as to medications in the glass containers 12, and they are transported to the appropriate patients' rooms. When such an assembly is to be used by a nurse, she first compares the label thereon with a patient's chart to ensure that it is the correct medication intended for the patient. She then manipulates walls of the flexible bag portion 30 of the IV-bag 28 to depress a tab 44 of the stopper remover 34. By manipulating this tab 44, the stopper remover 34 can be removed from the lower end 36 of the hard mouth portion 32 of the IV-bag 28, and when this is done, the male-threaded protrusion 40 carries the stopper 18, to which it is engaged, with it. The stopper remover 34 and the attached stopper 18 fall into the interior of the bag portion 30 of the IV-bag 28 and communication is then allowed between an interior of the glass container 12 and the interior of the bag portion 30 of the IV-bag 28. The entire assembly is then suspended from a support by means of a plastic loop 46 which is integral with the plastic coaster 14 on the medication vial 10. The medication from the glass container 12 of the medication vial and the carrier fluid from the IV-bag 28 are then mixed and administered via a lumen 48 into a patient.

Figure 2:
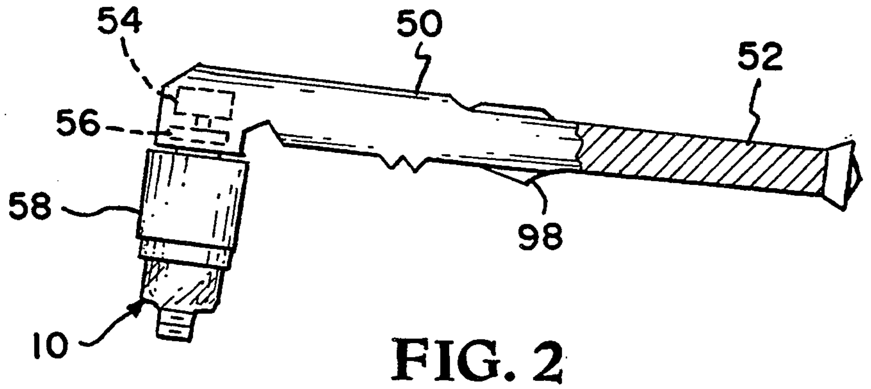
FIG. 2 is a side view of a medication-vial hand tool of this invention while holding and manipulating a vial which has been taken from a rack depicted in FIG. 3.
Figure 3:
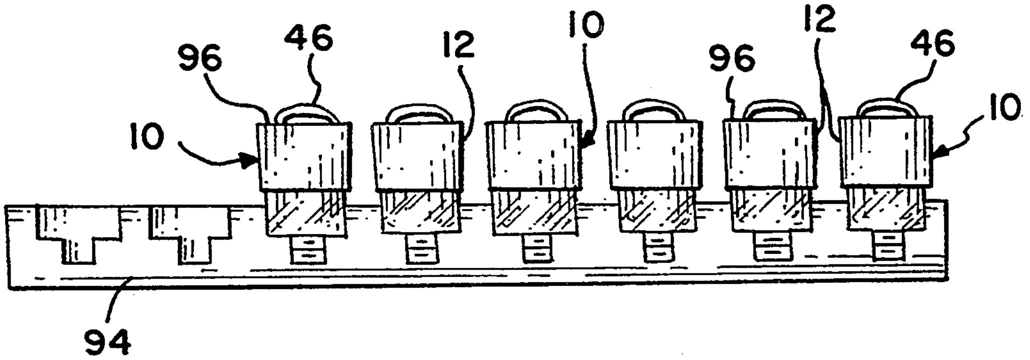
FIG. 3 is a cutaway side view of a plurality of medication vials being held in a rack to be manipulated by the hand tool of FIG. 2.

Turning now to the embodiment of the invention depicted in FIG. 2, a medication-vial hand tool 50 comprises a hand grip 52, an electric rotary motor 54, a clutch 56, a socket 58, and various controls, circuits and shafts for interconnecting these members.

Looking more particularly at the socket 58 in relation to FIG. 1, the socket comprises a bowl-shaped shell 60, a resilient-material annularly-shaped lining 62, a hard-plastic retainer 64, and an attachment device 66.

In this embodiment, the attachment device comprises a bolt 68, with a head 70, which is inserted from inside the shell 60 outwardly through an opening 72 at an attaching end 74 of the shell 60. Threads on the bolt 68 mate with a nut 76 outside the shell so that the attachment device 66 clamps a wall of the shell 60 between the head 70 and the nut 76. Thus, the attaching device 66 is held tightly on the shell 60 concentric with an axis 77 of the shell 60. An attachment key 78 protrudes outwardly, away from a mouth end 80 of the shell 60. The attachment key has a locking latch 82 thereon which engages with a linkage member (not shown) of the clutch 56 of the medication-vial tool 50.

The resilient-material lining 62 is of a relatively soft rubber material and is formed in the annular shape of a tube, or hollow cylinder. In this regard, the resilient-material lining 62 is not adhered to the shell 60, but rather is held in a cavity 84 thereof by means of the annularly-shaped retainer 64 which has male threads thereon for screwing into female threads at a mouth 86 of the shell 60. The retainer 64 is of a relatively hard resinous plastic; in any event it is quite a bit harder than the resilient-material lining 62. A vial-receiving cavity 88 defined by the resilient-material lining 62 is of a size for snugly fitting an outer, radially-directed, surface 90 of the plastic coaster 14 of the medication vial 10. An interior surface 92 of the retainer 64 is slightly larger in diameter than the vial-receiving cavity 88 to allow easy entrance of the medication vial 10 into the interior of the socket 58; however, it should be sufficiently small, not much bigger than the outer diameter of the medication vial 10, so that it can guide the medication vial 10 into the snug cavity 88, holding it straight and aligned with the axis 77.

In operation of the medication-vial tool 50, the attachment key 78 is engaged with a female coupling member (not shown) of the clutch 56 and is interlocked therewith by the locking latch 82 (or, in another embodiment, a set screw) so that the tool 50 is basically as shown in FIG. 2. A number of charged medication vials 10 are inserted into a medication-vial rack 94 upside down. The hand grip 52 is gripped by a user and the medication-vial tool 50 is manipulated so that a bottom-end portion 96 of a medication vial 10 is inserted through a guiding interior surface 92 of the retainer 64 into the vial-receiving cavity 88 of the resilient-material insert 62. In this respect, because the retainer is of a relatively hard material, the medication vial 10 is easily guided therethrough and placed in a relatively straight attitude, aligned with the axis 77, as it approaches and is inserted into the vial-receiving cavity 88 of the resilient-material insert 62. Thus, the medication vial 10 can be relatively easily placed into the vial-receiving cavity 88.

Once the medication vial 10 is inserted into the vial-receiving cavity 88 a sufficient distance, radially-applied friction between the resilient-material lining 62 and an outer surface of the plastic coaster 14 is sufficient for holding the medication vial 10 in the socket 58 so that an operator can simply manipulate the hand grip 52 to lift the medication vial 10 with the medication-vial tool 50. The operator holds the hard mouth portion 32 of the IV-bag 28 in one hand (not shown) and the medication-vial tool 50 in the other hand (not shown) while bringing the male threads 22 of the glass container 12 into engagement with the female threads 24 of the hard mouth portion of the IV-bag 28. Once these threads are in engagement, the operator presses on a trigger 98 of the hand tool 50 to activate the electric rotary motor 54 to rotate the socket via the clutch 56 for rotating the medication vial 10 so as not only to engage the threads 22 and 24 but also to engage the male-threaded portion 40 of the stopper remover 34 with the stopper 18. The clutch 56 is calibrated such that once the medication vial 10 has been screwed onto the IV-bag 28 with sufficient torque, the clutch 56 no longer transmits rotary motion from the rotary motor 54 and the operator knows to release the trigger 98. The hand grip 52 and IV-bag 28 are then manipulated to pull the socket 58 off of the medication vial 10.

The medication-vial tool 50 can be used in a similar manner for detaching a medication vial 10 from an IV-bag by making the rotary motor 54 to be reversible. In this regard, when vials are screwed to IV-bags by hand, as is done in the prior art, it is very difficult to unscrew them by hand. Because it is extremely important that the vials be absolutely sealed with the IV-bags, technicians tend to over-tighten them so as to be sure there is a good seal between them. Thus, when a mistake is made, and it becomes necessary to unscrew a vial from an IV-bag, technicians often have difficulty doing this and often damage the IV-bags in the process. Damaged IV-bags must be discarded. Similarly, technicians tend to over-tighten vials when they first begin to work, but tend to under-tighten them as they, the technicians, become tired. If vials are under-tightened, they may leak, in which case they also must be discarded. When coined vials and IV-bags must be discarded, it is quite expensive for hospitals. Not only do the hospitals lose the medicine, vials, and IV-bags involved, but also new, special, vial-IV-bag combinations must be prepared to replace the discarded ones, which involves time and effort.

Figure 4:
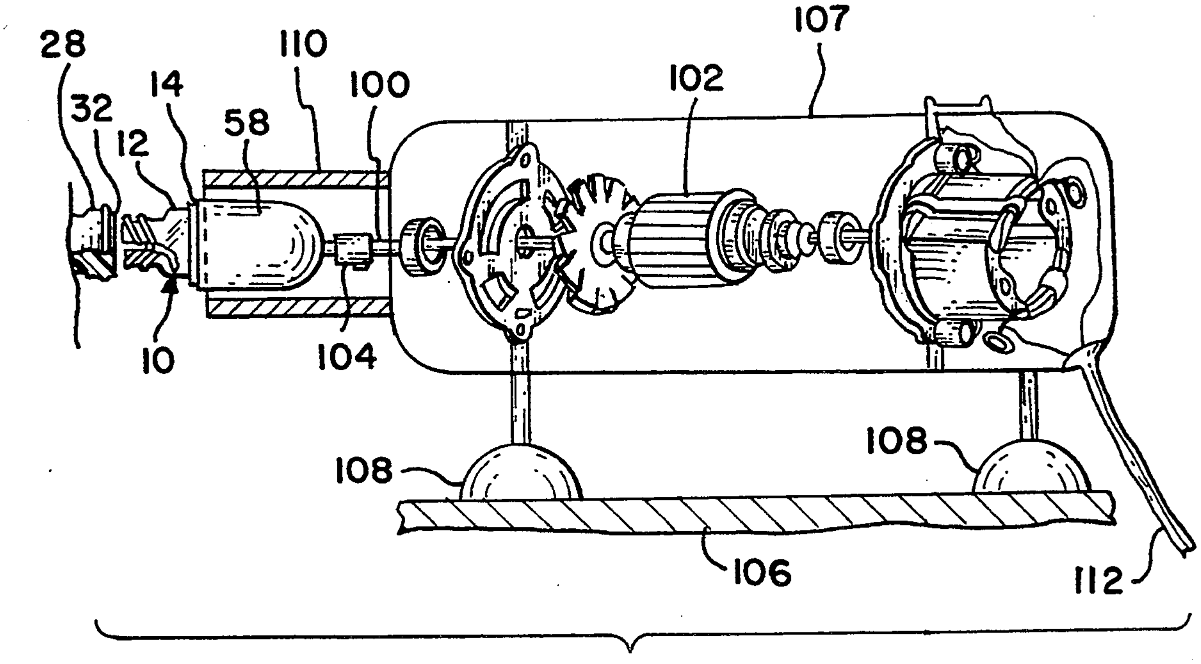
FIG. 4 is a schematic, partially-exploded, segmented, partially-cutaway, view of a table-mounted embodiment of this invention shown mounted on a table while assembling a medication vial with an IV-bag.

Another embodiment of this invention, and actually the preferred embodiment, is depicted in FIG. 4. In the FIG. 4 embodiment, the socket 58 is the same as the socket depicted in the FIGS. 1 and 2 embodiments, however, in the FIG. 4 embodiment, the socket 58 is attached to a shaft 100 of a table-mounted motor 102 by means of a set-screw sleeve 104. That is, in the FIG. 4 embodiment, there is no clutch between the socket 58 and the motor 102, but rather there is direct engagement therebetween. In the preferred embodiment, the mouth of the socket 10 is directed somewhat horizontally, although it is not necessary that it be directed precisely horizontally. A motor housing 107, containing the motor 102, is mounted on a table, or platform, 106 by means of rubber suction cups 108 and has a tubularly-shaped protective hood 110 affixed thereto for surrounding the rotating socket 58. In this regard, in the preferred embodiment, the socket 58, whose mouth is directed laterally, is continually rotated by the motor 102.

The method of using the tool depicted in FIG. 4 involves attaching the motor housing 107 to the table 106 with the suction cups 108 and activating the electric motor 102 by means of a switch, which could be, for example, in an electric cord 112. The electric cord 112 can, of course, have various controls therein, such as on-off controls and power controls. Further, such controls could be in the motor housing 107. However, in general, the motor 102 is turned on to continually rotate the socket 58. While the socket 58 is rotated, a technician places a bottom end of a medication vial 10 into the socket 58, generally in the same manner as shown in FIG. 1. As the medication vial 10 is inserted into the socket 58, the technician can feel that the vial 10 is being gripped by the radially directed surface of the resilient-material insert 62 and that a rotating force is being applied to the vial. Once the technician believes that there is sufficient friction between the medication vial 10 and the resilient-material insert 62, the technician moves a hard mouth portion 32 of an IV-bag 28 so that female threads thereof engage male threads of the rotating medication vial 10. Since the technician is preventing the IV-bag from rotating, but the medication vial is being rotated by the socket 58, the male and the female threads will be quickly screwed together. Because the forces which are creating friction between the resilient-material insert 62 and the outer surface of the medication vial 10 are being applied radially, the technician can determine how much force is desired by inserting the medication vial to a greater or lesser extent into the socket 58, and this can be changed even during engagement of the male and female threads. In any case, once the medication vial 10 is fully screwed into the IV-bag 28, there will be slippage between the medication vial 10 and the resilient-material insert 62 so that a clutch is not needed to slow down rotation of the socket 58. The technician can easily feel when the medication vial is screwed into the IV-bag far enough and at this point pulls the IV-bag with the attached medication vial away from the socket 58 and repeats this process with another medication vial and IV-bag.

It has been found that, with the FIG. 4 embodiment, as many as twenty vials can be screwed together with IV-bags in 20 seconds as opposed to requiring almost five minutes for this number when they are screwed in by hand. Further, it has been found that the vials can be screwed into the IV-bags in a more consistent manner, to achieve a more uniform final torque, than when this is done by hand. A uniform end torque is beneficial for ensuring that there is no leakage and for allowing possible unscrewing if necessary.

The protective hood 110 protects the rotating socket 58 from coming into contact with loose material, such as ties and the like.

While the invention has been particularly shown and described with reference to a preferred embodiment, it will be understood by those of ordinary skill in the art that various changes in form and detail may be made therein without departing from the spirit and scope of the invention.

The medication-vial tool 50 can be operated directly with an electric cord or it can include a rechargeable battery. Also, the hand tool 50 can be used without a clutch and so that the socket 58 is continually rotated.

It would be possible to use many different attachment devices 82 and 104 to attach the bowl-shaped shell 60 of the socket 58 to a shaft of an electric rotary motor. In this regard, it is important that such an attachment be positive and strong, because the medication vials 10 are held rather tightly in the socket 58 and when the socket is pulled off of the vials 10, after they are attached to the IV-bags 28, it is undesirable that the sockets stay with the vials.

It will be understood by those of ordinary skill in the art that this invention allows hospital technicians to screw medication vials into IV-bags much more quickly and easily than was possible in the prior art.

Yet another benefit of this invention is that hospital personnel using the invention to assemble medication vials with IV-bags do not damage their bodies. That is, they can quickly assembly the medication vials with the IV-bags without increasing the risk of getting carpal tunnel syndrome.

The fact that the resilient material insert 62 of the socket of this invention makes frictional contact with medication vials mainly at surfaces facing radially is a benefit, because with this structure rotational forces transmitted to the vials can be adjusted by inserting the vials to a greater or lesser degree. This feature also helps allow the system to function without a clutch between a motor and the socket.

Another helpful structural feature of this invention is the hard plastic retainer, 64 which not only holds the resilient material insert 62 in the shell 60, but also serves as a guide for medication vials, holding them straight as they are inserted into, and held in, the vial-receiving cavity 88 of the resilient-material insert 62. This member also can be used for applying pressure on the resilient-material insert so that it flexes inwardly to apply more pressure on vials radially. Such an adjustment can be used for compensating for wear of the resilient-material lining 62. Further, resilient-material inserts can easily be replaced simply by detaching the retainer 64 from the shell 60.

It is beneficial that in one embodiment the socket is continually rotated as vials are inserted therein, screwed onto IV-bags and removed therefrom, because in this manner there is less wear on the motor, fewer manipulations are required by the operator, and the operation can be carried out faster.

Another significant feature of this invention is the direction in which the mouth of the socket 58 is facing when the motor housing 107 is mounted on the horizontal platform 106. That is, the socket mouth is facing substantially horizontally. It is helpful to be able to load vials into the socket from the side, if not directly horizontally at least along a horizontal component. That is, it would be difficult for a technician to hold mouths of loaded IV-bags facing vertically downwardly when they are being screwed to vials, because the loads in bag portions 30 thereof would be unsupported. With this invention, the loaded IV-bags can be slid along the horizontal platform 106 while their mouths are mated with medicine vials. However, this invention can also be used in an embodiment in which vials are loaded vertically.

Further, it would be possible to construct the resilient-material insert 62 so that it applies frictional forces axially on the bottom of the medication vial 10 rather than radially.

The embodiments of the invention in which an exclusive property or privilege are claimed are defined as follows:

1. A method of screwing medication vials to IV-bags comprising the steps of:

providing a power tool having a rotatable socket movably attached thereto, said rotatable socket having a mouth at one end thereof dimensioned to frictionally receive therein and rotate a bottom end portion of a medication vial;

providing a medication vial having a bottom end portion and a threaded neck;

providing an IV-bag having a threaded mouth;

inserting the bottom-end portion of the medication vial into the mount of the rotatable socket;

inserting the threaded neck of the medication vial rotating the socket containing the bottom portion of the medication vial therein with the power tool while holding the threaded mouth of the IV-bag stationary thereby threadingly connecting the medication vial to the IV-bag; and removing the rotatable socket from the bottom portion of the medication vial.

2. The method of claim 1 wherein the power tool includes a motor mounted on a hand-manipulatable handle and wherein the socket is attached to the motor and arranged to provide a frictional engagement with the medication vial such that the vial can be manipulated by manipulating the handle to insert the threaded neck of the medication vial into the threaded mount of the IV-bag.

3. The method of claim 2 wherein the socket comprises a bowl-shaped hard shell containing an annularly-shaped resilient member.

4. The method of claim 1 wherein the socket comprises a bowl-shaped hard shell containing a fixed annularly-shaped resilient member for engaging and releasably retaining the bottom end portion of the medication vial inserted in the socket.

5. The method of claim 1 wherein the power tool for rotating the socket is supported on a horizontal platform.

6. The method of claim 5 wherein the steps of (a) inserting the bottom end portion of a medication vial into the mouth of a socket, (b) inserting the threaded neck of the medication vial into a threaded mouth of an IV-bag, and (c) rotating the socket with the power tool while holding the neck of the IV-bag stationary, are carried out while maintaining the mouth opening of the socket substantially along a horizontal component.

7. The method of claim 1 wherein the steps of (a) inserting the bottom end portion of a medication vial into the mouth of a socket, (b) inserting the threaded neck of the medication vial into a threaded mouth of an IV-bag, and (c) rotating the socket with the power tool while holding the neck of the IV-bag stationary, are carried out while the power tool provides continuous rotation to the socket.

* * * * *

UNITED STATES PATENT AND TRADEMARK OFFICE

CERTIFICATE OF CORRECTION

PATENT NO. : 5,339,511

DATED : August 23, 1994

INVENTOR(S) : Magaret A. Bell

It is certified that error appears in the above-indentified patent and that said Letters Patent is hereby corrected as shown below:

Column 8, line 7, "mount" should read --mouth--.
Column 8, line 8, the words --into the threaded mouth of the IV-bag;-- should be inserted after "vial".

Signed and Sealed this

Eighth Day of November, 1994

Attest:

Bruce Lehman

BRUCE LEHMAN

*Attesting Officer*

*Commissioner of Patents and Trademarks*